(12) United States Patent
Reberga et al.

(10) Patent No.: US 7,969,131 B2
(45) Date of Patent: Jun. 28, 2011

(54) CONVERTER CIRCUIT WITH FORWARD AND BACKWARD CONTROL

(75) Inventors: Jacques Reberga, Saint-Loup-de-Fribois (FR); Melaine Philip, Blainville/Orne (FR); Emeric Uguen, Domjean (FR)

(73) Assignee: NXP B.V., Eindhoven (NL)

(*) Notice: Subject to any disclaimer, the term of this patent is extended or adjusted under 35 U.S.C. 154(b) by 344 days.

(21) Appl. No.: 11/573,190

(22) PCT Filed: Aug. 2, 2005

(86) PCT No.: PCT/IB2005/052581
§ 371 (c)(1),
(2), (4) Date: Aug. 14, 2008

(87) PCT Pub. No.: WO2006/016322
PCT Pub. Date: Feb. 16, 2006

(65) Prior Publication Data
US 2008/0298089 A1     Dec. 4, 2008

(30) Foreign Application Priority Data

Aug. 4, 2004   (EP) .................................... 04300515

(51) Int. Cl.
*G05F 1/563*   (2006.01)
*G05F 1/565*   (2006.01)
(52) U.S. Cl. .................. 323/273; 323/283; 323/285
(58) Field of Classification Search .............. 323/222, 323/223, 299, 351, 273–285
See application file for complete search history.

(56) References Cited

U.S. PATENT DOCUMENTS

| 3,920,918 A | * | 11/1975 | Thomas | 370/508 |
| 6,157,182 A | * | 12/2000 | Tanaka et al. | 323/284 |
| 6,681,987 B1 | * | 1/2004 | Ford | 235/380 |
| 2001/0019258 A1 | | 9/2001 | Frohler et al. | |

FOREIGN PATENT DOCUMENTS

| WO | WO0247025 A | 6/2002 |
| WO | WO2004051831 A | 6/2004 |

OTHER PUBLICATIONS

Mattavelli P: "Digital Control of DC-DC Boost Converters With Inductor Current Estimation"; Applied Power Electronics Conf. and Exposition 2004; APEC 04; Nineteenth Annual IEEE Anaheim CA US Feb. 22-26, 2004; Piscataway NJ USA; vol. 1, Feb. 22, 2004 pp. 74-80.
Phillips D: "New Cycles Proportionality Factor Eases PFM Converter Design"; Electronic Design Penton Media; Cleveland OH US vol. 45, No. 23; Oct. 23, 1997; pp. 89-90, 92, 94, 9.

* cited by examiner

*Primary Examiner* — Adolf Berhane
*Assistant Examiner* — Nusrat J Quddus

(57) ABSTRACT

The present invention relates to a converter circuit and a conversion method for converting an input signal of a first value to an output signal of a second value based on a switched operating mode, wherein an output feedback loop (40) and an additional input forward control loop (60) are provided. The additional input forward control loop (60) serves to correctly control a switching parameter not only with respect to the output load but also over a wide input voltage range. This leads to an improved power efficiency and reliability of the converter circuit.

8 Claims, 2 Drawing Sheets

CONVERTER CIRCUIT WITH FORWARD AND BACKWARD CONTROL

FIELD OF THE INVENTION

The present invention relates to a converter circuit for converting an input signal of a first value to an output signal of a second value based on a switched operating mode, and to a corresponding conversion method.

BACKGROUND OF THE INVENTION

Regulated or controlled power supplies are found in virtually all electronic devices, including battery chargers, cellular telephones, computers, computer monitors, televisions, audio equipment and video cameras. One typical power supply is a converter, such as a direct current to direct current converter (in the following simply designated as DC converter), which operates from a power source, generates an alternating signal as an intermediate process and delivers an output signal to a load. The DC converter accepts a DC input voltage and produces a DC output voltage. Typically, the produced output voltage is at a different value or level than the input voltage.

In a typical pulse width modulation (PWM) regulator circuit, a square wave is provided to the control terminal of a switching device to control its on-states and off-states. Since increasing the on-time of the switching device leads to an increase of the output voltage and vice versa, the output voltage may be controlled by manipulating the duty cycle of the square wave. This manipulation is accomplished by a control circuit in a control loop, which continuously compares the output voltage with a reference voltage and adjusts the duty cycle of the square wave to maintain a substantially constant output voltage.

As an alternative, pulse frequency modulation (PFM) of the voltage regulation provides better efficiency at small output current levels than the above PWM mode. First, a PFM mode requires fewer turn-on transitions to maintain a constant output voltage than a PWM mode, resulting in a lower gate-drive power dissipation of the switching transistor. Second, since the PFM mode can be achieved with a much simpler control circuit having fewer components, the power dissipation in a control loop of the PFM mode is less than in the control loop of the PWM mode. However, when the output current reaches a moderate level, the PFM mode of voltage regulation becomes impractical, since the maximum output current available from the PFM mode is generally much less than that available from the PWM mode.

FIG. 1 shows a schematic block diagram of a conventional converter circuit which generates a regulated output voltage Vout from a variable input voltage Vin. The output voltage Vout can have a higher value than the input voltage Vin and is substantially constant, although the input voltage Vin and the output load may change. Such DC voltage converters usually use an inductor L to store energy generated by a current flowing through the inductor L and a switching device 20, which may be a power transistor or another controllable semiconductor switching device. The switching device 20 is used to switch off the respective current path, so that the energy stored in the inductor L is then transmitted as a current via a diode D to the output and charges a capacitor C connected in parallel to the output terminal. By continuously switching on and off the switching device 20, the energy stored in the inductor L is continuously transferred via the diode D to the capacitor C and charges the capacitor C. The diode D serves to provide decoupling between the voltage at the capacitor C and the voltage at the switching device 20, so that the output voltage Vout can be higher than the input voltage Vin. As already mentioned, the switching device 20 may be controlled in a PWM operating mode with a fixed frequency, wherein the duty cycle or the duration of the switching phase is controlled in order to keep the output voltage Vout substantially constant.

On the other hand, the switching device 20 may be operated in a PFM operating mode, wherein the switching frequency is changed in order to keep the output voltage Vout substantially constant. The switched operating mode is controlled by a driver circuit 10 comprising an oscillator and generating a corresponding control signal, such as a rectangular signal, supplied to the control terminal of the switching device 20.

The output voltage Vout is regulated or controlled by a feedback loop 40 which compares the value of the output voltage Vout with a reference voltage and then adjusts the switching frequency or duty cycle in accordance with the comparison result. In order to improve efficiency of the converter, an additional switching device 30 may be provided at the diode D or instead of the diode D, in order to remove the threshold voltage of the diode D. The additional switching device 30 may be controlled by a separate driver device or by the driver device 10 that controls the switching device 20.

In the following, a complete three-phase operating cycle of the DC converter is described:

In a first phase, the switching device 20 is switched on and the additional switching device 30 is switched off, so that a current flows through the inductor L and the switching device 20 and energy is stored in the inductor L for one oscillator cycle.

In the second phase, the switching device 20 is switched off and the additional switching device 30 is switched on, so that the current now flows to the capacitor C and energy is transmitted to the capacitor C.

In the third phase, the switching device 20 and also the additional switching device 30 are switched off, e.g. between the first and second phases or when the output voltage Vout has reached the correct or desired voltage value.

The output voltage Vout is controlled by the feedback loop 40 which allows or initiates the start of a new operating cycle if the output voltage is too low, to thereby increase the switching frequency or the duty cycle. The switching phases must be carefully controlled by the driver device 10 in order to avoid the switching device 20 and the additional switching device 30 from being switched on simultaneously.

The amount of energy that can be transmitted to the output is directly linked to the inductance value of the inductor L and the switching period of the oscillator in the driver device 10. For a given inductance value and oscillator frequency, the desired output power can be delivered only for a limited input voltage range. As a consequence, unexpected or sudden drops of the input voltage beyond this limited range may lead to considerable changes in the output voltage.

Document US 2003/0214276 A1 discloses a DC converter, wherein a regulated output voltage and an output current are generated by using a switching device for providing the output current and controlling the switching device with a first control circuit functioning in a PWM mode and, in an alternative manner, with a second control circuit functioning in a PFM mode. A second feedback circuit is included in the second control circuit and a time delay is introduced in a second feedback circuit in order to introduce a limitation of pulse frequency. Thereby, it is possible to detect overload conditions, that may occur when the converter operates in the PFM mode, and to switch back to the PWM mode.

OBJECT AND SUMMARY OF THE INVENTION

It is an object of the present invention to provide a converter circuit and conversion method, by means of which detrimental effects resulting from unexpected drops in input voltage can be prevented or at least alleviated.

This object is achieved by a converter circuit of the aforesaid kind, comprising:

a) a first control loop for comparing said first value of said input signal with a first reference value and for controlling a switching parameter of said switched operating mode in response to the comparison result; and b) a second control loop for comparing said second value of said output signal with a second reference value and for controlling said switching parameter of said switched operating mode in response to the comparison result.

Furthermore the object of the invention is achieved by a method of the aforesaid kind, comprising the steps:

a) a first comparison step for comparing said first value of said input signal with a first reference value;

b) a first control step for initiating control of a switching parameter of said switched operating mode in response to the result of said first comparison step;

c) a second comparison step for comparing said second value of said output signal with a second reference value; and d) a second control step for initiating control of said switching parameter in response to the result of said second comparing step.

Accordingly, an additional forward control loop is provided which monitors the value of the input signal, and controls the switching parameter based on the monitoring result, such that the switching frequency or another switching parameter can be directly changed in case of an input voltage drop or change. Hence, the output voltage is correctly regulated not only with respect to the output load but also over a wide input voltage range. This leads to an improved power efficiency and reliability of the converter circuit.

The first value may be a voltage value of the input signal and the second value may be a voltage value of the output signal. Thereby, it is possible to obtain an improved DC voltage converter as a specific example of the dual loop converter circuit.

The switching parameter may be an operating frequency of the switched operating mode. In this case, the first controlled loop is adapted to reduce the operating frequency when the first value drops below the first reference value. The use of the operating frequency as the switching parameter provides the advantage of a simple driver device with a simple controllable oscillator, such as a voltage-controlled oscillator.

Moreover, the conversion may be based on at least one switched inductor.

Furthermore, sequencer means may be provided for allowing control of the switching parameter only after completion of an operating cycle. This ensures that the operating cycle is always correctly finished and there is no detrimental effect on the output voltage due to a phase change. Additionally, the sequencer means may be adapted to give priority to the second control loop. Thereby, it is ensured that the two control loops work without interference.

The converter circuit may be arranged in an integrated circuit for generating a power supply of an electronic device, wherein the first control loop comprises a monitoring means for monitoring a supply voltage of the integrated circuit. This is advantageous in that a voltage monitoring circuit already provided in the integrated circuit can be at least partly incorporated into the converter circuit.

BRIEF DESCRIPTION OF THE DRAWINGS

The present invention will now be described based on a preferred embodiment of the invention with reference to the accompanying drawings.

DESCRIPTION OF EMBODIMENTS

The preferred embodiment will now be described on the basis of a DC converter that may be used in an integrated circuit for generating the power supply of an electronic device, such as a smart card, for example.

Figure 1:
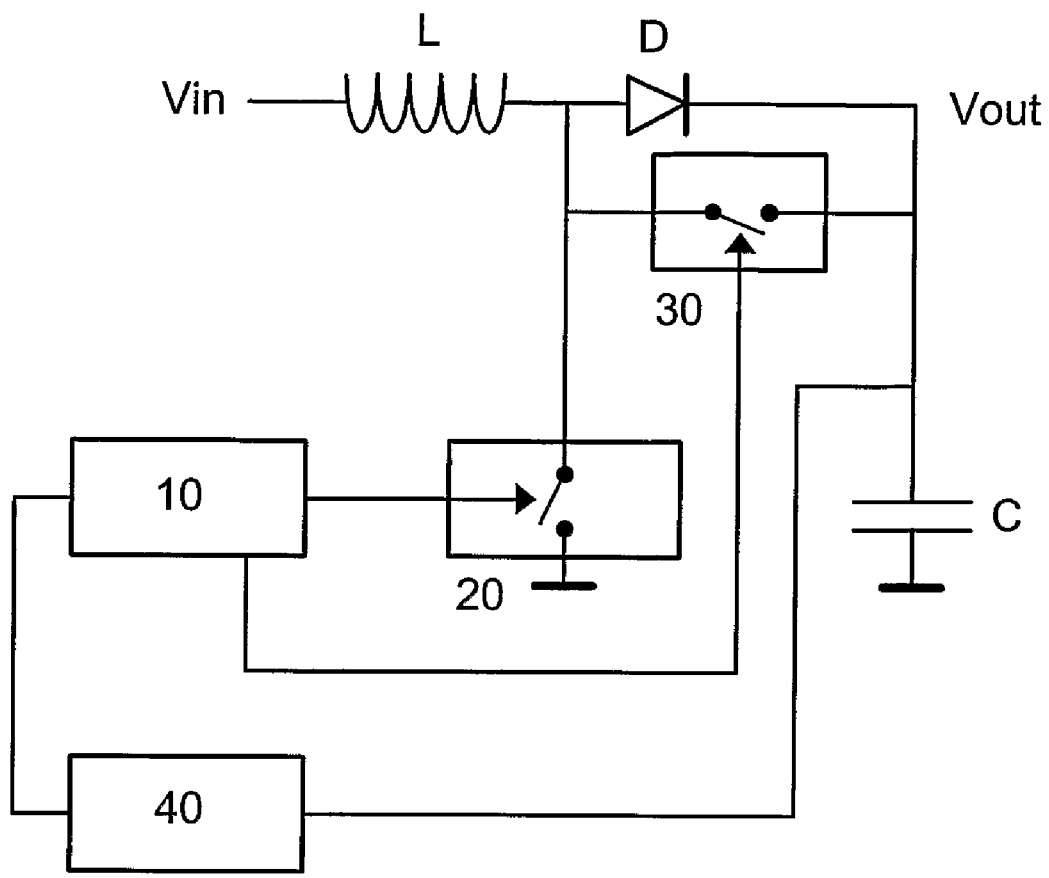
FIG. 1 shows a schematic block diagram of a conventional DC converter circuit.
Figure 2:
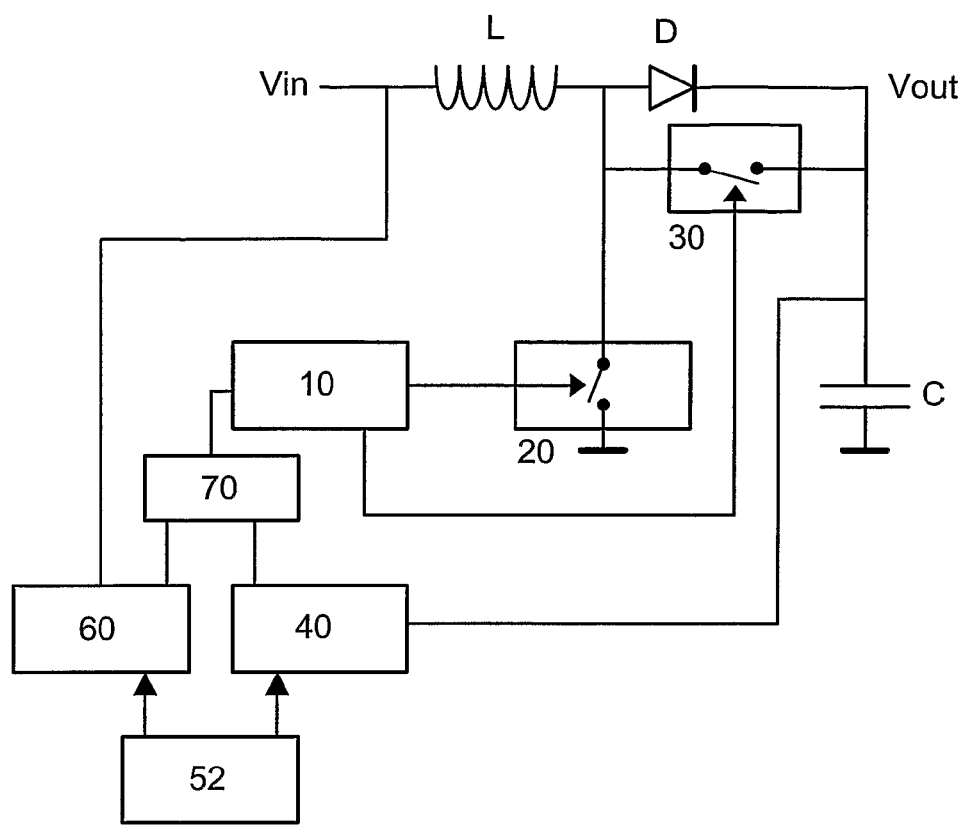
FIG. 2 shows a schematic block diagram of a DC converter circuit according to said preferred embodiment.

FIG. 2 shows a schematic block diagram of the DC converter according to the preferred embodiment. In addition to the conventional circuit of FIG. 1, the preferred embodiment comprises an input control loop 60, which monitors or surveys the value of the input voltage Vin and compares it with an input reference voltage supplied by a reference voltage generator 52, which may be a semiconductor circuit or a resistor network suitable to generate a reference voltage from a supply voltage. In the preferred embodiment, the reference voltage generator 52 may also generate the first reference voltage supplied to an output control or feedback loop 40.

It is noted that the basic functionality of the switching device 20, the driver device 10 with the oscillator, the additional switching device 30 and the output control loop 40 basically corresponds to the conventional circuit described in connection with FIG. 1, so that a description of these parts of the circuit can be omitted here for reasons of brevity.

The additional input control loop 60 can be regarded as a forward control loop which serves to get a wide input voltage range with only one inductance value of the inductor L, due to the fact that the frequency or any other switching parameter such as duty cycle phase, or the like, of the oscillator is adjusted based on the result of monitoring the value of the input voltage Vin. When the input voltage Vin is too low, the oscillator frequency is reduced in order to increase the duration of the initially described first phase of the operating cycle of the converter circuit to thereby allow storing more energy in the inductor L and thus make available more energy to be transmitted to the output side, i.e., to the capacitor C.

Of course, other switching parameters of the switching operation may be controlled by the input control loop 60 to thereby adjust the duration of the operation phases of the converter circuit.

In case of a fast change of the input voltage Vin, the new input control loop 60 reacts quickly by changing the oscillator frequency or other switching parameter(s). However, this fast parameter change may result in a phase change which may disturb the current operating cycle, e.g., it may switch on the switching device 20 and the additional switching device 30 simultaneously, which results in a steep drop of the output voltage Vout. This detrimental effect can be prevented by optionally providing an additional sequencer 70, which controls the different operation phases involved in driving the switching device 20 and the additional switching device 30 and allows changes of the switching parameter only after completion of an operating cycle. The sequencer 70 may be a digital sequencer arranged as a state machine, i.e. a logical circuit with a state latching or storing behavior. The sequencer 70 provides the advantage that the operating cycle is always correct and steep voltage drops at the output can be prevented.

The proposed converter circuit with this additional input control loop 60 together with the optional sequencer 70 provides the effect of an automatic change of at least one of the oscillator frequency and other switching parameters in case of a drop or change of the input voltage Vin. If the sequencer 70 is provided, the control loops 40, 60 work without interference, while priority may be given to the output control loop 40 which is then allowed to complete its operating cycle before the occurrence of any change of the switching parameter(s) caused by the input control loop 60. As a result, the operating cycle is always correctly and fully completed and there is no output voltage glitch or short circuit due to sudden phase changes. The output voltage Vout can thus be correctly regulated or controlled not only with respect to changes in the output load but also over a wide input voltage range. This improves power efficiency and reliability of the proposed converter.

It is noted that the proposed converter can be used in any circuitry where an output signal, which may be an output voltage Vout or an output current, needs to be regulated against a wide variation of the value of an input signal, e.g. an input voltage Vin or an input current. As a specific example, said proposed converter can be used in an integrated circuit that generates the power supply of electronic devices, such as smart cards or the like.

If used in an integrated circuit, the input control loop 60 may comprise or consist of a voltage supervisor or monitoring circuit or unit which surveys or monitors the power supply of the integrated circuit itself. When the power supply suddenly drops, the supervisor circuit sends a signal to the proposed converter that changes its switching parameter, e.g. working frequency, without effecting any voltage drop at its output. Hence, the output voltage Vout used to supply, for example, a smart card is kept at its correct regulated value, e.g. during the deactivation phase of the smart card.

In summary, unwanted switching states during fast changes of the input voltage Vin and a following phase change of the switching frequency or switching parameter of the control circuit can be prevented by the proposed additional input control loop 60. As a preferable option, an additional sequencer 70 may be used which allows changes of the switching parameter only after completion of an operating cycle. By virtue thereof, the two control loops 40, 60 can operate without interference, while priority may be given to one of the control loops 40, 60, preferably the output control loop 40.

It is noted that the present invention is not restricted to the above-described preferred embodiment but can be used in any converter circuit where a switched operating mode is used for converting an input signal of a first value to an output signal of a second value. Moreover, the proposed additional input control loop 60 can be used in all kinds of converter circuits, such as step-down buck converters, step-up boost converters, buck-boost converters, CUK converters, isolated DC converters, flyback converters, forward converters and current converters, which are all based on a switched operating mode. Preferred embodiments may thus vary within the scope of the attached claims.

It must further be noted that the term "comprising", when used in the specification including the claims, is intended to specify the presence of stated features, means, steps or components, but does not exclude the presence or addition of one or more other features, means, steps, components or groups thereof. Furthermore, the word "a" or "an" preceding an element in a claim does not exclude the presence of a plurality of such elements. Moreover, any reference sign does not limit the scope of the claims. The invention can be implemented by means of both hardware and software, and several "means" may be represented by the same item or hardware. It should also be noted that features and advantages of the invention which are described separately or in combination with another feature or advantage can also appear in combination or separately.

The invention claimed is:

1. A converter circuit for converting an input signal of a first value to an output signal of a second value based on a switched operating mode, said converter circuit comprising:
   a first control loop for comparing said first value of said input signal with a first reference value and for controlling a switching parameter of said switched operating mode in response to the comparison result; and
   a second control loop for comparing said second value of said output signal with a second reference value and for controlling said switching parameter of said switched operating mode in response to the comparison result; and
   a sequencer for allowing change of said switching parameter only after completion of an operating cycle such that said first and said second control loop work without interference with said sequencer adapted to give priority to said second control loop.

2. A converter circuit according to claim 1, wherein said first value is a voltage value of said input signal and said second value is a voltage value of said output signal.

3. A converter circuit according to claim 1, wherein said switching parameter is an operating frequency of said switched operating mode.

4. A converter circuit according to claim 1, wherein said first control loop is adapted to reduce said operating frequency when said first value drops below a first reference value.

5. A converter circuit according to claim 1, wherein said conversion is based on at least one switched inductance.

6. An integrated circuit for generating a power supply of an electronic device, said integrated circuit comprising a converter circuit according to claim 1, wherein said first control loop comprises a monitoring means for monitoring a supply voltage of said integrated circuit.

7. An integrated circuit according to claim 1, wherein said electronic device is a smart card device.

8. an input signal of a first value into an output signal of a second value based on a switched operating mode, said method comprising:
   a first comparison step for comparing said first value of said input signal with a first reference value;
   a first control step for initiating control of a switching parameter of said switched operating mode in response to the result of said first comparison step;
   a second comparison step for comparing said second value of said output signal with a second reference value; and
   a second control step for initiating control of said switching parameter in response to the result of said second comparison step,
wherein changing of said switching parameter is allowed only after completion of an operating cycle such that said first and said second control loop work without interference and priority is given to said second control loop.

* * * * *